US006889251B1

(12) United States Patent
Zhang

(10) Patent No.: US 6,889,251 B1
(45) Date of Patent: May 3, 2005

(54) COMPUTER SYSTEMS AND METHODS EMPLOYING THIN-CLIENT INTERNET LAUNCHING MECHANISMS

(75) Inventor: Weifeng Zhang, Milpitas, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 799 days.

(21) Appl. No.: 09/639,711

(22) Filed: Aug. 14, 2000

(51) Int. Cl.[7] .................. G06F 15/16; G06F 15/177; G06F 9/24; G06F 9/445
(52) U.S. Cl. ................... 709/220; 709/228; 713/2
(58) Field of Search .................... 709/202, 203, 709/217, 219, 221, 226, 229, 220, 227, 228; 717/120, 122, 168, 170, 172, 173, 176; 713/2, 1

(56) References Cited
U.S. PATENT DOCUMENTS 6,073,166 A * 6/2000 Forsen .................. 709/206
6,594,757 B1 * 7/2003 Martinez ............... 709/221
2001/0048677 A1 * 12/2001 Boys ..................... 370/352

* cited by examiner

Primary Examiner—Paul H. Kang

(57) ABSTRACT

Improvements to computer systems and methods that permit platform identification to provide service and technical support to users. The present invention employs a compact Internet agent that is preferably part of a basic input output system (BIOS) of user computer systems. An operating system of the user computer systems operate to set up a registry. Each user computer system contains a web browser that is used to contact the central server by way of the Internet, for example when it is launched. The Internet agent is used to identify the user computer system during system BIOS boot. The BIOS launches when a user computer system is turned on, which launches the Internet agent. The Internet agent adds a predetermined number (preferably two) MIME (Multipurpose Internet Mail Extension) headers to a registry. The default browser web page is changed to point to a web page on the central server. The MIME headers are inactive and useless until the web browser is launched and the user computer system connects to the web page. The central server analyzes the HTTP (Hyper Text Transfer Protocol) request upon connection. If the MIME headers are identified, the server identifies the user computer system, optionally asks the user for registration, and pushes service content to the user computer system.

12 Claims, 2 Drawing Sheets

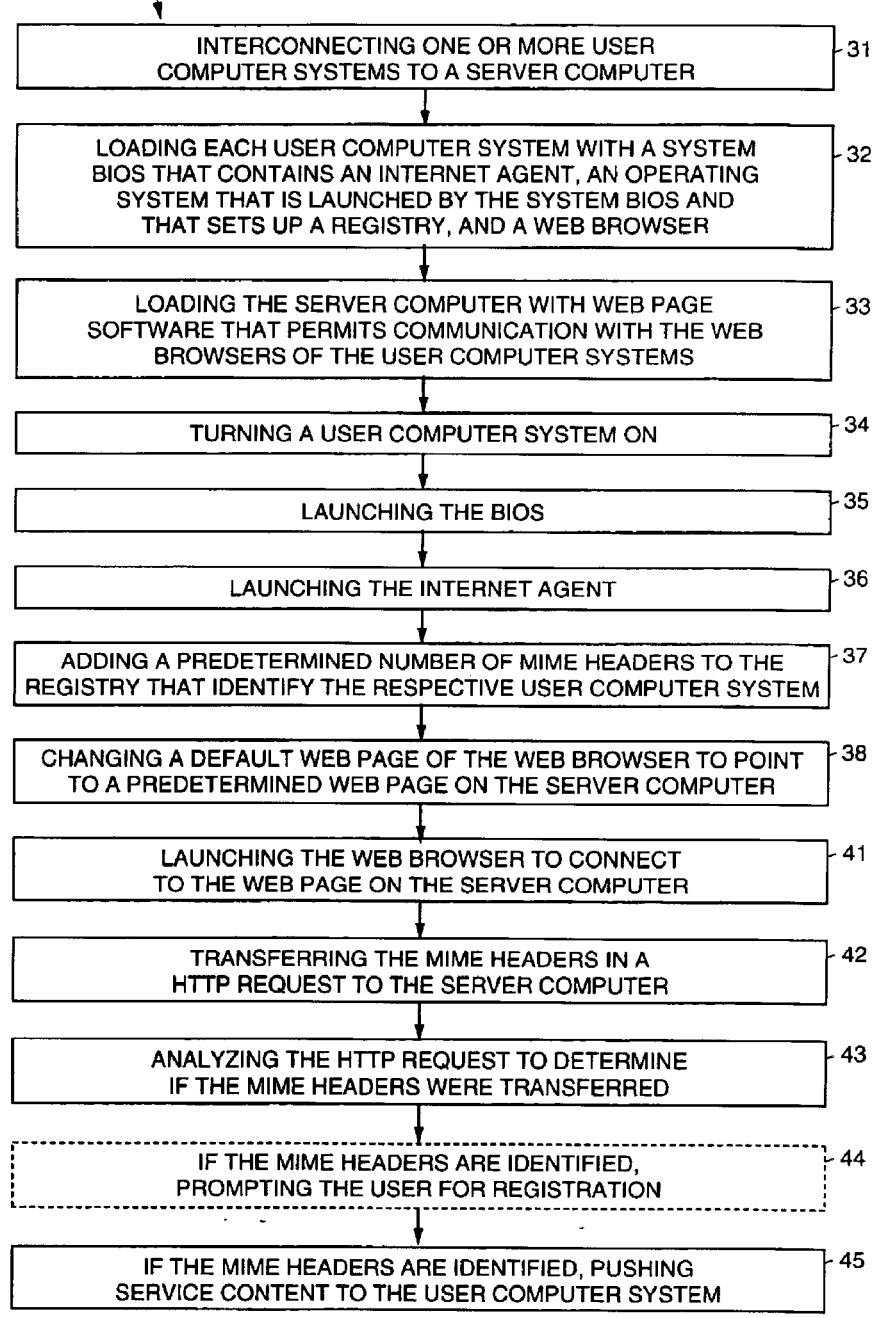

COMPUTER SYSTEMS AND METHODS EMPLOYING THIN-CLIENT INTERNET LAUNCHING MECHANISMS

BACKGROUND

The present invention relates generally to computer systems and methods, and more particularly, to a compact Internet agent that is part of a basic input output system (BIOS) of a computer system that permits platform identification to provide service and technical support to users.

Personal computers have a basic input output system (BIOS) which is a firmware program that is typically stored in a nonvolatile random access memory (or flash memory). The BIOS brings up the computer system when it is turned on. Many Windows™-based personal computers use a BIOS developed by the assignee of the present invention, know as PhoenixBIOS.

It has been found that it is often desirable to upgrade software or firmware or provide customized services to users. In the past, in order to upgrade or secure customized services, users have had to launch a web browser, select or input the desired web page address (such as the PhoenixNet web page, and interactively choose services or downloads that might be desirable. This tends to be time consuming, and also delays the upgrade or customization based upon the user.

It would be desirable to have the ability to automatically upgrade or customize software or firmware using the Internet. It would be desirable to be able to provide this upgrading and customization from a central server using a small amount of firmware on a user computer in a fast and nonintrusive manner.

It is therefore an objective of the present invention to provide for a compact (thin) Internet agent that is part of a basic input output system (BIOS) of a computer system that permits platform identification in order to provide quality service and technical support to users.

SUMMARY OF THE INVENTION

To accomplish the above and other objectives, the present invention provides for a variety of improvements to computer systems and methods. The present invention includes a compact Internet agent (referred to as iAgent) and corresponding methods. The Internet agent is part of a basic input output system (BIOS) of user computer systems that permits platform identification to provide service and technical support to users. The operating system of the respective user computer systems operate to set up a registry, such as a registry generated when using a Windows™ operating system.

The Internet agent is preferably built into (part of) the system BIOS (such as the well-known PhoenixBIOS developed by the assignee of the present invention) and is used to "clientify" the platform during system BIOS boot. This allows the assignee of the present invention, for example, through a web page on its PhoenixNet server computer and the Internet, to provide service and technical support to users from a central server. The user computer system also contains a web browser that is used to contact the central server when it is launched.

The BIOS launches when a user computer system is turned on. The BIOS in turn, and at the appropriate time, launches the Internet agent. The Internet agent adds a predetermined number (preferably two) of special MIME (Multipurpose Internet Mail Extension) headers to the registry. The default web browser web page is changed to point to the web page on the central server.

The MIME headers are special in that they are inactive and useless until a user launches the web browser and connects to the web page. The central server analyzes the HTTP (Hyper Text Transfer Protocol) request upon connection. If the MIME headers are identified, the central server knows it is interacting with a PhoenixNet customer whose computer system operates using the PhoenixBIOS. The central server optionally asks the user for registration, and pushes service content to the user computer system. After the connection is established, any other related web activity can ensue.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 2 is a flow diagram that illustrates an exemplary Internet agent and corresponding method in accordance with the principles of the present invention.

DETAILED DESCRIPTION

Figure 1:
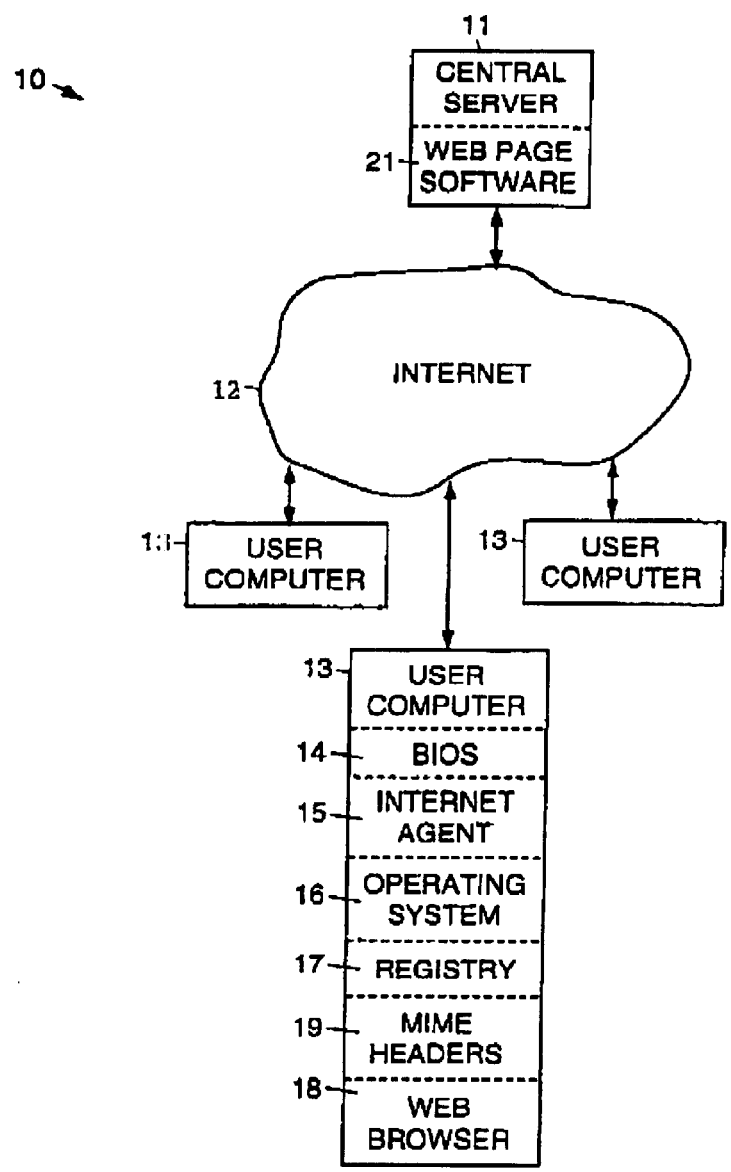
FIG. 1 illustrates an exemplary system in which the present invention is used.

Referring to the drawing figures, FIG. 1, illustrates an exemplary system 10 in which the present invention may be used. The system 10 comprises a central server 11 which is coupled to the Internet 12, along with a plurality of user computer system 13 which are also coupled to the Internet 12. The central server 11 may be a PhoenixNet central server operated by the assignee of the present invention. It is to be understood that interconnection of the central server 11 and user computer systems 13 may be readily achieved in any manner that permits transfer of Internet mail-type messages, and may included intranets, wireless and other communication media.

Each of the user computer systems 13 comprises a system BIOS (basic input output system) 14, such as the well-known PhoenixBIOS developed by the assignee of the present invention. Each user computer system 13 comprises an Internet agent (iAgent) 15 implemented in accordance with the principles of the present invention. The Internet agent 15 is preferably built into (part of) the system BIOS 14, such as the well-known PhoenixBIOS developed by the assignee of the present invention.

Each user computer system 13 comprises an operating system 16 that is launched by the system BIOS 14. The operating system 16 of the user computer system 13 operates to set up a registry 17, such as a Windows-type registry, for example, when launched. Each user computer system 13 comprises a web browser 18 that is used in the context of the present invention to contact the central server 11 and when it is launched.

The Internet agent 15 is used to "clientify" the user computer system 13 during system BIOS boot in the manner described in detail below. The Internet agent 15 adds a predetermined number (preferably two) of special MIME (Multipurpose Internet Mail Extension) headers 19 to the registry 17. Examples of the MIME headers 19 that may preferably be employed with the Internet agent 15 are Content-Type:text/PTL and User-Agent: PTL/1.0.

The Internet agent 15 changes the default browser web page to point to the (PhoenixNet) web page on the central server 11. Once the Internet agent 15 "clientifies" the user computer system 13 during booting of the system BIOS 14, the central server 11 and the Internet 12 are used to provide service and technical support to users.

In operation, the BIOS 14 launches when the user computer system 13 is turned on. The BIOS 14 in turn, and at the appropriate time, launches the Internet agent 15. The Internet agent 15 adds the MIME headers 19 to the registry 17. The default web page of the web browser 18 is changed to point to the web page on the central server 11.

The MIME headers 19 added in the registry 17 may be, but are not limited to, "User-Agent", or "Content-Type". The MIME headers 19 are special in that they are inactive and useless until a user launches his or her web browser 18 and connects to the PhoenixNet web page on the server computer 11.

The PhoenixNet central server 11 analyzes the HTTP (Hyper Text Transfer Protocol) request. If the MIME headers 19 are identified, the central server 11 knows it is interacting with a PhoenixNet customer whose computer system 13 operates using PhoenixBIOS. The central server 11 optionally asks the user for registration, and pushes service content to the user computer system 13. After the connection is established, any other PhoenixNet related web activity can ensue.

The Internet agent 15 is preferably treated as a regular feature of the system BIOS 14, and is enabled or disabled by user in the BIOS power on self test (POST) setup menu of the system BIOS 14. The Internet agent 15 does not require a user's identification and thus there is no personal privacy violation, and is fast and easy to implement. Since the Internet agent 15 does not detect or sniff a user's network connection, there is no slow-down during system boot. When the user invokes the web browser 18, it fetches the MIME headers 19 from the registry 17, which makes the connection to the PhoenixNet web page on the central server 11 automatic and seamless.

Because of the simplified functionality, the Internet agent 15 is very thin (compact) and flexible. This is particularly desirable, which allow for a minimum amount of precious read only memory (ROM) space to be used for the BIOS 14. Also because of this, the code used to implement the Internet agent 15 may be made universal. There is no customization required for deployment of the Internet agent 15. There is no ROM upgrade required even if the services and features delivered by the PhoenixNet web page are changed. The Internet agent 15 does not require knowledge about user's web browser 18.

Advantages of the present invention are that Internet agent 15 is compact and efficient and requires limited ROM space. Connection and clientification using the Internet agent 15 is fast and nonintrusive. The Internet agent 15 is easy to implement and fast to deploy. The Internet agent 15 makes customized services centralized in the a central server 11, such as, internationalization, multiple language support, time zone, and country code. It is easy to add or change features and services.

FIG. 2 is a flow diagram that illustrates an exemplary method 30 in accordance with the principles of the present invention that permits identification of user computer systems 13 to provide service and technical support. The method 30 comprises the following steps.

One or more user computer system 13 are interconnected 31 to a central server (e.g. server computer) 11, such as by way of the Internet 12 or by way of an intermediate intranet and server. Each user computer system 13 is loaded 32 with a system BIOS 14 that preferably contains an Internet agent 15, an operating system 16 that is launched by the system BIOS 14 and that sets up a registry 17, and a web browser 18. The server computer 11 is loaded 33 with web page software that permits communication with the web browsers 13 of the user computer systems 13.

A user computer system 13 is turned on 34. The BIOS 14 is launched 35, which in turn, launches 36 the Internet agent 15. The Internet agent 15 operates to add 37 a predetermined number of MIME headers 19 to the registry 17 that identify the user computer system 13. The Internet agent 15 also operates to change 38 a default web page of the web browser 18 to point to a predetermined web page on the server computer 11.

A user launches 41 the web browser 18 to connect to the web page on the server computer 11. The MIME headers 19 are transferred 42 in a HTTP (Hyper Text Transfer Protocol) request to the server computer 11. The central server 11 analyzes 43 the HTTP request to determine if the MIME headers 19 were transferred. If the MIME headers 19 are identified, the central server 11 optionally prompts 44 or asks 45 the user for registration, and pushes 45 service content to the user computer system 13.

Thus, a compact Internet agent that is part of a basic input output system (BIOS) and method that permits platform identification to provide service and technical support to users have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method that permits identification of a user computer system to a server computer connected thereto configured to deliver service and technical support to users, comprising the steps of:

interconnecting one or more user computer systems to the server computer each of the one or more user computer systems including a system BIOS that includes an Internet agent, an operating system that is launched by the system BIOS and that sets up a registry, and a web browser; and launching the Internet agent upon launch of the BIOS, the Internet agent operative to;

add a predetermined number of Multipurpose Internet Mail Extension (MIME) headers to the registry that identify the user computer systems;

change a default web page of the web browser to point to a web page on the server computer;

launch the web browser;

connect to the web page on the server computer; and transfer the MIME headers in Hyper Text Transfer Protocol (HTTP) request to the server computer;

receiving service content from the server computer if the MIME headers were transferred.

2. The method recited in claim 1 wherein the step of interconnecting one or more user computers to the service computer comprises interconnecting the one or more user computers to the server computer by way of the Internet.

3. The method recited in claim 1 further comprising the step of transmitting user registration data upon request of the server computer after the Multipurpose Internet Mail Extension (MIME) headers are identified.

4. The method recited in claim 1 wherein the MIMI headers comprise Content-Type:text/PTL and User-Agent:PTL/1.0.

5. A computer system comprising:
one or more user computer systems that each comprise a system BIOS and an operating system that is launched by the system BIOS that sets up a registry;
a central server coupled to the one or more user computer programs;
a web browser disposed on each of the user computer systems;
an Internet agent that is part of the BIOS of each user computer system that functions to add a predetermined number of Multipurpose Internet Mail Extension (MIME) headers to the registry to identify the respective user computer system, and that changes a default web page of the web browser of the respective user computer system to point to a web page on the server computer; and
web page software disposed on the central server that communicates with the web browsers of the respective user computer systems and that analyze Hyper Text Transfer Protocol (HTTP) requests transferred from the web browsers of the respective user computer systems to determine if MIME headers were transferred therewith, and that pushes service content from the server computer to the user computer if the MIME headers are present.

6. The computer system recited in claim 5 wherein the MIME headers 9 comprise Content-Type:text/PTL and User-Agent:PTL/1.0.

7. The computer system in claim 5 wherein the one or more user computers and the server computer are interconnected by way of the Internet.

8. The computer system recited in claim 5 wherein the web page software also prompts a user for registration after the Multipurpose Internet Mail Extension (MIME) headers are identified.

9. In a computer system comprising one or more user computer systems that each have a system BIOS and an operating system that is launched by the system BIOS and sets up a registry, a central server coupled to the user computer systems, a web browser disposed on each of the user computer systems, wherein the improvement comprising:
an Internet agent that is part of the BIOS of each user computer system that functions to add a predetermined number of Multipurpose Internet Mail Extension (MIME) headers to the registry to identify the respective user computer system, and that changes a default web page of the web browser of the respective user computer system to point to a web page on the server computer; and
web page software disposed on the central server that communicates with web browsers of the respective user computer systems and that analyzes Hyper Text Transfer Protocol (HTTP) requests transformed form the web browsers of the respective user computer systems to determine if MIME headers were transferred therewith, and that pushes service content from the server computer to the user computer if the MIME headers are present.

10. The improvement recited in claim 9 wherein the MIME headers comprise Content-Type:text/PTL and User-Agent:PTL/1.0.

11. The improvement recited in claim 9 wherein the one or more user computers and the server computer are interconnected by way of the Internet.

12. The improvement recited in claim 9 wherein the web page software prompts a user for registration after the Multipurpose Internet Mail Extension (MIME) headers are identified.

* * * * *